(12) United States Patent
Liu et al.

(10) Patent No.: US 11,030,268 B2
(45) Date of Patent: *Jun. 8, 2021

(54) PROCESSING TREE STRUCTURE HAVING BREADCRUMB ROOT NODE

(71) Applicant: International Business Machines Corporation, Armonk, NY (US)

(72) Inventors: Jian Liu, Beijing (CN); Dikran S. Meliksetian, Danbury, CT (US); Yang Sun, Beijing (CN); Zhi J. Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 196 days.

This patent is subject to a terminal disclaimer.

(21) Appl. No.: 16/255,967

(22) Filed: Jan. 24, 2019

(65) Prior Publication Data

US 2019/0155858 A1 May 23, 2019

Related U.S. Application Data

(63) Continuation of application No. 15/444,406, filed on Feb. 28, 2017, now Pat. No. 10,275,537, which is a (Continued)

(30) Foreign Application Priority Data

May 15, 2009 (CN) .......................... 200910140990.8

(51) Int. Cl.
*G06F 16/95* (2019.01)
*G06F 16/954* (2019.01)
(Continued)

(52) U.S. Cl.
CPC ........ *G06F 16/954* (2019.01); *G06F 16/9027* (2019.01); *G06F 16/951* (2019.01);
(Continued)

(58) Field of Classification Search
USPC ...................................................... 707/755
See application file for complete search history.

(56) References Cited

U.S. PATENT DOCUMENTS

| 7,085,755 B2 | 8/2006 | Bluhm et al. |
| 7,210,094 B2 | 4/2007 | Dovin et al. |

(Continued)

FOREIGN PATENT DOCUMENTS

CN 1591425 3/2005

OTHER PUBLICATIONS

Hendry, David G.; Communication Functions and the Adaptation of Design Representations in Interdisciplinary Teams; DIS2004, Aug. 1-4, 2004, Cambridge Massachusetts, USA. pp. 123-132.
(Continued)

*Primary Examiner* — Tamara T Kyle
*Assistant Examiner* — Raheem Hoffler
(74) *Attorney, Agent, or Firm* — Schmeiser, Olsen & Watts, LLP; Nicholas L. Cadmus

(57) ABSTRACT

In response to receiving a request for visiting a first web task associated with a website, a first task node is generated at a breadcrumb root node in a tree structure. In response to sequentially receiving requests for multiple subtasks of the first web task, multiple subtask nodes of the first task node are sequentially established in the tree structure. The subtask nodes of the multiple subtask nodes of the first task node are sequentially connected to the first task node according to a sequential order of the sequentially received requests for the multiple subtasks of the first web task. The multiple subtask nodes of the first task node are processed based a policy of the first web task, which includes dynamically reconfiguring the multiple subtask nodes of the first task node in response to the user's visitation of one or more subtask nodes of the multiple subtask nodes.

18 Claims, 5 Drawing Sheets

Related U.S. Application Data continuation of application No. 12/755,662, filed on Apr. 7, 2010, now Pat. No. 9,613,151.

(51) Int. Cl.

| | |
|---|---|
| *G06F 16/951* | (2019.01) |
| *G06F 16/958* | (2019.01) |
| *G06F 16/901* | (2019.01) |
| H04L 29/08 | (2006.01) |
| G06F 16/24 | (2019.01) |
| G06F 16/27 | (2019.01) |
| G06F 40/14 | (2020.01) |
| G06F 40/205 | (2020.01) |

(52) U.S. Cl.
CPC ............ *G06F 16/958* (2019.01); *G06F 16/24* (2019.01); *G06F 16/273* (2019.01); *G06F 40/14* (2020.01); *G06F 40/205* (2020.01); H04L 29/0854 (2013.01); H04L 67/1095 (2013.01)

(56) References Cited

U.S. PATENT DOCUMENTS

| | | | |
|---|---|---|---|
| 8,010,910 B2* | 8/2011 | Wright | G06F 16/9027 715/738 |
| 8,078,962 B2 | 12/2011 | Aoki et al. | |
| 8,887,100 B1 | 11/2014 | Cook et al. | |
| 9,613,151 B2 | 4/2017 | Liu et al. | |
| 2002/0069215 A1* | 6/2002 | Orbanes | G06F 16/954 707/E17.141 |
| 2002/0089550 A1* | 7/2002 | Orbanes | G06F 16/954 715/853 |
| 2003/0172078 A1* | 9/2003 | Stumpf | G06F 16/904 |
| 2004/0105659 A1 | 10/2004 | Barry et al. | |
| 2005/0278351 A1* | 12/2005 | Niyogi | G06F 16/9558 |
| 2006/0168522 A1 | 7/2006 | Bala | |
| 2007/0033092 A1* | 2/2007 | Iams | G06Q 30/0203 705/7.32 |
| 2007/0156651 A1* | 7/2007 | Weigel | G06F 16/313 |
| 2009/0063517 A1* | 3/2009 | Wright | G06F 16/54 |
| 2009/0063547 A1* | 3/2009 | Wright | G06F 16/64 |
| 2009/0210855 A1 | 8/2009 | Ramanathan | |
| 2010/0293546 A1 | 11/2010 | Liu et al. | |
| 2017/0177734 A1 | 6/2017 | Liu et al. | |

OTHER PUBLICATIONS

Blustein et al.; An Evaluation of Look-ahead Breadcrumbs for the WWW; HT'05, Sep. 6-9, 2005, Salzburg, Austria. pp. 202-204.

Office Action (dated Jan. 10, 2012) for U.S. Appl. No. 12/755,662, filed Apr. 7, 2010.
Amendment (dated Apr. 10, 2012) for U.S. Appl. No. 12/755,662, filed Apr. 7, 2010.
Final Office Action (dated Aug. 17, 2012) for U.S. Appl. No. 12/755,662, filed Apr. 7, 2010.
Final Amendment (dated Oct. 15, 2012) for U.S. Appl. No. 12/755,662, filed Apr. 7, 2010.
Advisory Action (dated Nov. 13, 2012) for U.S. Appl. No. 12/755,662, filed Apr. 7, 2010.
Notice of Appeal (dated Nov. 19, 2012) for U.S. Appl. No. 12/755,662, filed Apr. 7, 2010.
Appeal Brief (dated Jan. 18, 2013) for U.S. Appl. No. 12/755,662, filed Apr. 7, 2010.
Office Action (dated May 23, 2013) for U.S. Appl. No. 12/755,662, filed Apr. 7, 2010.
Amendment (dated Aug. 21, 2013) for U.S. Appl. No. 12/755,662, filed Apr. 7, 2010.
Final Office Action (dated Dec. 16, 2013) for U.S. Appl. No. 12/755,662, filed Apr. 7, 2010.
Final Amendment (dated Feb. 18, 2014) for U.S. Appl. No. 12/755,662, filed Apr. 7, 2010.
Advisory Action (dated Mar. 13, 2014) for U.S. Appl. No. 12/755,662, filed Apr. 7, 2010.
Notice of Appeal (dated Mar. 17, 2014) for U.S. Appl. No. 12/755,662, filed Apr. 7, 2010.
Appeal Brief (dated May 9, 2014) for U.S. Appl. No. 12/755,662, filed Apr. 7, 2010.
Examiner's Answer (dated Sep. 11, 2014) for U.S. Appl. No. 12/755,662, filed Apr. 7, 2010.
Reply Brief (dated Nov. 10, 2014) for U.S. Appl. No. 12/755,662, filed Apr. 7, 2010.
Notice of Allowance (dated Nov. 22, 2016) for U.S. Appl. No. 12/755,662, filed Apr. 7, 2010.
AThe Difference Between the Internet and World Wide Web@, retrieved on Dec. 28, 2017 from the Internet: <URL: https://www.webopedia.com/DidYouKnow/Internet/Web_vs_internet_asp>, 1 page.
Office Action (dated Sep. 28, 2017) for U.S. Appl. No. 15/444,406, filed Feb. 28, 2017.
Amendment (dated Dec. 28, 2017) for U.S. Appl. No. 15/444,406, filed Feb. 28, 2017.
Final Office Action (dated May 11, 2018) for U.S. Appl. No. 15/444,406, filed Feb. 28, 2017.
Final amendment (dated Jul. 9, 2018) for U.S. Appl. No. 15/444,406, filed Feb. 28, 2017.
Advisory Action (dated Aug. 24, 2018) for U.S. Appl. No. 15/444,406, filed Feb. 28, 2017.
RCE (dated Sep. 24, 2018) for U.S. Appl. No. 15/444,406, filed Feb. 28, 2017.
Notice of Allowance (dated Dec. 5, 2018) for U.S. Appl. No. 15/444,406, filed Feb. 28, 2017.

\* cited by examiner

PROCESSING TREE STRUCTURE HAVING BREADCRUMB ROOT NODE

This application is a continuation application claiming priority to Ser. No. 15/444,406, filed Feb. 28, 2017, now U.S. Pat. No. 10,275,537 issued Apr. 30, 2019, which is a continuation of Ser. No. 12/755,662, filed Apr. 7, 2010, U.S. Pat. No. 9,613,151, issued Apr. 4, 2017.

FIELD OF THE INVENTION

The present invention relates to the field of web page browsing and, more particularly, to a breadcrumb method and system for a website.

BACKGROUND OF THE INVENTION

Over the past more than twenty years, the performance and capacity of computer networks, especially the Internet, have soared along the rapid development of electronic technologies. Many users interact with web page servers in order to achieve their purposes. To this end, they browse through and use various services, e.g. meeting organization, flight booking, hotel reservation, and destination customs viewing, via the Internet. To organize a meeting, users possibly need to book a meeting room, view participants' time, and send a notification via a network system. To book an airline ticket via a Internet, users possibly need to view times of airline tickets, view airlines, make confirmation and pay for the tickets. During these operations, users might repeat visits to some web pages. Hence, it is necessary to present the hierarchy of a website to users in an organized way and to lead them to easily find and manage information so that they would not get lost when browsing the website. A breadcrumb trail is thus arranged for facilitating users' visit.

The arrangement of the breadcrumb trail in web applications provides a convenient means for users to browse web pages forward or backward. The breadcrumb trail records users' browsing history and provide the browsing history to them visually. The breadcrumb trail is a linear link identification consisting of a row of hierarchical property links in a website, such as home>>about>>recruitment>>position. This breadcrumb trail can clearly display the location in the overall hierarchy of the page browsing history such that users will not get lost and can be directly linked to corresponding pages. Compared with a browse forward or backward function that is provided by web pages or a browser, the breadcrumb trail is more convenient and better adapted to users' browsing logic.

The breadcrumb trail is applied to an increasing extensive range among newly developed web tasks. By using various technical means, the breadcrumb trail provides visitors to websites with certain channels, such that visitors can visit desired content conveniently. Hence, the breadcrumb trail becomes a fast channel from a page to another page history during website browsing. Pages that were browsed through can be found using the breadcrumb trail. However, inventors of the present invention have noted that the full utilization of the breadcrumb trail is significantly limited by some technical problems related to the breadcrumb trail. A brief description is given below to part of these problems, which has been noticed by the inventors.

There are typically numbers of web pages in a web application, coupled with numerous browse paths. A method of executing a breadcrumb trail through static coding can be easily implemented but is restricted by dynamic browse behaviors or dynamic web content. This method can hardly include all complicated browse logic between web pages. In addition, if a web page or a link between web pages changes, it is difficult to adapt static code to the change. Moreover, besides URL, each web page needs some status parameters to lead browse behaviors. Hence, this method does not support a dynamic page function due to its incapability of supporting dynamic parameters.

It is not allowed to operate on certain web pages for several times. For example, for performing a settlement, it is unreasonable to doing so twice. Hence, the breadcrumb trail should avoid such a repetitive operation mechanism in some cases.

A user-end breadcrumb trail, which stores user status by using a cookie, can support some content-rich user interfaces because it maintains some user status. However, rich user interfaces make the implementation more difficult. The compatibility that a browser supports cookies should be solved. At present, the browser's support of cookies is rather restricted. In addition, it is quite hard to store/read complicated objects in cookies. For example, a user might block a cookie, or a cookie is subjected to a restriction of 4K storage capacity in each domain. Moreover, it is difficult for a cookie to identify or avoid operations which are not allowed.

In view of the drawbacks in the prior art, the breadcrumb trail can be used for effectively delivering website information to users. In addition, the breadcrumb trail may be properly service-intelligent so as to avoid the conflict between its breadcrumb function being provided for users and business logic in web tasks.

SUMMARY OF THE INVENTION

The present prevention provides a breadcrumb method, system and computer program product for a website. In response to a request for visiting the website, a breadcrumb root node is generated in a tree structure. After generating the breadcrumb root node and in response to receiving a request for visiting a first web task associated with the website, a first task node is generated in the tree structure at the breadcrumb root node. After generating the first task node and in response to sequentially receiving requests for multiple subtasks of the first web task, multiple subtask nodes of the first task node are sequentially established in the tree structure. The subtask nodes of the multiple subtask nodes of the first task node are respectively associated with the subtasks of the multiple subtasks of the first web task and are sequentially connected to the first task node according to a sequential order of the sequentially received requests for the multiple subtasks of the first web task. After sequentially establishing in the tree structure the multiple subtask nodes of the first task node, the multiple subtask nodes of the first task node are processed based a policy of the first web task.

DETAILED DESCRIPTION OF THE INVENTION

Figure 5:
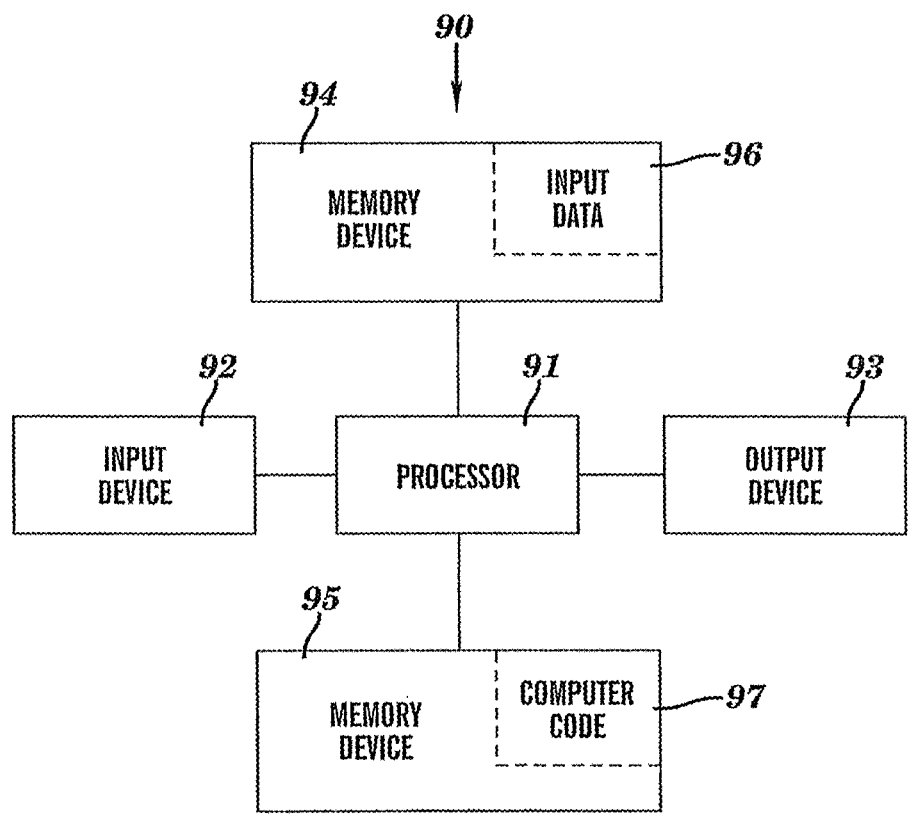
FIG. 5 illustrates a computer or computer system that implements embodiments of the present invention.

The present invention will be described below with reference to methods and means according to embodiments of the present invention. Each block in flowcharts and/or a block diagram and a combination of respective blocks in the flowcharts and/or block diagram can be implemented by program code 97 (i.e., computer program instructions) though use of the computer or computer system 90 of FIG. 5 system embodiments of the present invention. These computer program instructions can be provided a processor 91. Hence, a machine is built such that means implementing functions/operations specified in blocks in the flowcharts and/or block diagram are produced by these instructions executed by a computer or other programmable data processing apparatus.

These computer program instructions 97 can be stored in a computer readable medium (e.g., memory device 95) that can cause a computer or other programmable data processing apparatus to work in a specific manner. In this way, instructions stored in the computer readable medium produce an artifact that comprises instruction means implementing functions/operations specified in blocks in the flowcharts and/or block diagram.

Further, computer program instructions can be uploaded to a computer or other programmable data processing apparatus such that a series of operating steps are performed on the computer or other programmable data processing apparatus in order to produce a compute implemented process. In this way, the process of implementing functions/operations specified in blocks in the flowcharts and/or block diagram can be provided by executing instructions on the computer or other programmable apparatus.

Thus, the computer or e computer system 90 comprises the processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code (i.e., program code) 97 which is a computer program that comprises computer-executable instructions. The computer code 97 includes software or program instructions that may implement the embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Figure 1:
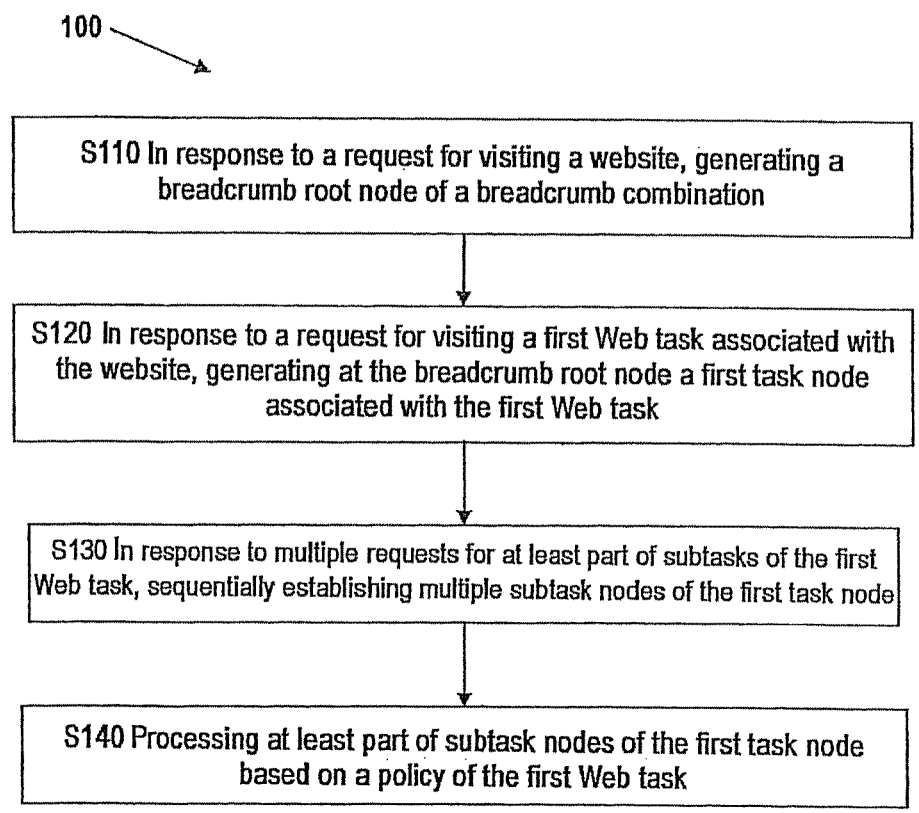
FIG. 1 shows a flowchart of a breadcrumb method according to an embodiment of the present invention.

FIG. 1 shows a flowchart according to an embodiment of the present invention, wherein a breadcrumb method 100 for a website is illustrated. The method may be performed on the processor 91 of FIG. 5 or a web server, e.g. a web application server. In step S110, a breadcrumb root node of a breadcrumb combination is generated in response to a request for visiting a website. A breadcrumb combination is a breadcrumb tree structure. The website may comprise multiple web tasks, such as a ticket booking task, a shopping task, and a hotel reservation task. These web tasks are supported by corresponding applications.

In step S120, in response to a request for visiting a first web task associated with the website, a first task node associated with the first web task is generated at the breadcrumb root node.

In step S130, in response to multiple requests for at least part of subtasks of the first web task, multiple subtask nodes of the first task node are established sequentially, wherein the multiple subtask nodes of the first task node are respectively associated with the at least part of subtasks of the first web task, and are sequentially connected in the order of the multiple requests.

The sequentially establishing of multiple subtask nodes of the first task node may further comprises the steps of: in response to a request for a first subtask among the multiple subtasks, generating a first subtask node of the first task node for invoking a first subtask page; in response to a request for a second subtask among the multiple subtasks, generating a second subtask node after the first subtask node, for invoking a second subtask page; and in response to a request for a third subtask among the multiple subtasks, generating third subtask node of the first task node, for invoking a third subtask page, wherein the first subtask node, the second subtask node, and the third subtask node are sequentially connected in the order of corresponding requests. The breadcrumb combination may be displayed below:

First task

First subtask→Second subtask→Third subtask

In step S140, at least part of subtask nodes of the first task node are processed based on a policy of the first web task.

After a user browses multiple subtask node pages of the first task, if he/she needs to browse part of the pages once again, he/she may select a corresponding subtask node. In response to the selection of a subtask node of the first task node, the web server invokes a page associated with the selected subtask node. Next, the server processes or sets the page according to page status parameters stored in a session with the user's client. Then, the server sends to the user's client the page the user previously browsed.

Those skilled in the art would appreciate that both of the request for visiting the website and the request for visiting the first web task can be sent to the website in a combined request. In addition, all of the request for visiting the website, the request for visiting the first web task, and the request for visiting a subtask of the first web task can be sent to the website in a combined request. Accordingly, the website generates a breadcrumb root node, a first task node, and subtask nodes thereof according to content of the combined request.

According to another embodiment of the present invention, multiple task nodes may be established in a breadcrumb combination created by the web server, so as to allow the user to switch among multiple web tasks. The breadcrumb method may further comprise the steps of: in response to a request for visiting a second web task associated with the website, generating at the breadcrumb root node a second task node associated with the second web task; in response to multiple requests for at least part of subtasks of the second web task, sequentially establishing multiple subtask nodes of the second task node, wherein the multiple subtask nodes of the second task node are respectively associated with the at least part of subtasks of the second web task, and are sequentially connected in the order of the multiple requests. At least part of subtask nodes of the second task node are processed based on a policy of the second web task. According to another embodiment, at least part of subtask nodes of each of the first task node and the second task node are processed based on a policy of the second web task.

According to an embodiment of the present invention, a breadcrumb combination may comprise one or more task nodes. For each task node, the user's visit history of multiple web pages can be displayed by a text line or a task bar. The breadcrumb combination can be implemented by creating a data structure in a web server. A top level of the data structure of the breadcrumb combination can store all lists of tasks that are initiated when the user is browsing the website.

For example, pseudo code of a breadcrumb combination is as below:

Class Breadcrumb combination: breadcrumb combination
Task node: List of Task node//list of task nodes
Function:
  StartTasknode (tasknodeToBeAdded: Tasknode)//A task node is added to a breadcrumb combination structure. For example, the user suddenly wants to reserve a hotel when he/she is booking an airline ticket. At this moment, this method can be invoked to create a new task and add it to the list of tasks.
  EndTasknode (tasknodeToBeFinished: Tasknode)//A task node ends (because the task has been finished), and is removed from the list of tasks. For example, the user has finished booking an airline ticket.
  SetCurrent Tasknode (tasknode: Tasknode)//A task node the user is operating is set.
Class Tasknode//task node
Members:
  Subtasknodes: List of Subtask node//list of subtask nodes
  Function:
    AddNewSubtasknode (node: Subtasknode)//A new subtask node is added to a task node. For example, during flight booking, after a click on "confirmation" in the "airlines" page, a subtask node reflecting the confirmed page is added to the task node's structure.
    RemoveSubtasknode (node: Subtasknode)//It can be used when the user exits. For example, if the user exits from the "confirmation" page back to the "airlines" page, then the subtask node of the "confirmation" page can be removed.
    ResetToSubtasknode (node: Subtasknode)//for multiple subtask nodes, reset to a specified subtask node
class Subtask node//subtask node
Members:
  GetParameterinformation: Map//The Parameter's status is got when a current subtask node is being visited
  PostParameterinformation: Map//store Post Parameter's status when a current subtask node is being visited The page status associated with a subtask node can be maintained by the server. A session identities s present at the client, via which information stored in the session can be retrieved from the server. In response to the client visiting the web server, the server can establish an Http session with the client and assigns a unique session identifier. The server further assigns a session storage space to the session and manages the session. Data in the session storage space can be shared in the session. After the session establishment, the request and response are communicated using the session identifier between the client and the server, and data in the session storage space is invoked.

The page status associated with a subtask node can be recorded by a session maintained by the server, and a request sent from the user to the server may include the session identifier. The client may not store any history record. All history information may be stored in a session on the server end. The server receives a client's request, judges which client based on a session identifier, retrieves the tree structure of a breadcrumb combination from the corresponding session, and generates an html document according to the tree structure. The server further sends the html document to the client, and the client is merely required to display the html document.

The client may send parameters associated with a page status to the server by Http get and Http post methods. These parameters are related to the user's interactions with a subtask of a web task, for example, the number of the pages of the browsed products. A page's then status can be better returned by recoding these additional parameters.

Therefore, parameters of a subtask node page the user has visited can be stored in the session by Http get and Hap post methods. In this way, the status of a web page the user has visited can be provided to the user.

The Http get method adds data to a URL (Uniform Resource Locator) uses a question mark ("?") to present the end of a URL address and the start of data, expresses each data element in the form of key/value, and uses a semimcolon (";") to differentiate multiple data elements. However, the data delivery using the Http get method is restricted by the URL and lengths of parameters.

The Http post method includes data into main body of an Http request, other than adding data to a URL. A data element is expressed in the form of key/value. Compared with the Http get method, the Http post method is not subjected to length restriction and allows transmission of secure/plentiful data.

The breadcrumb combination can be stored in a session established between the web server and the client. According to the breadcrumb combination, breadcrumb combination code that is supported by the client display can be generated, such as html code of the breadcrumb combination and WML (Wireless Markup Language) code displayed on a wireless client or a cellular phone. When the client is visiting a web task via the website, the breadcrumb combination code can be sent so that the breadcrumb combination is displayed on the client's browser. A corresponding task node and/or sequentially-connected multiple subtask nodes which the task node comprises can be displayed in the form of a task bar or a text line.

The first task node is used for invoking a visited page of the first web task. A subtask node is used for invoking a corresponding subtask page. In response to the user's click on a task node or a subtask node of the task node in the breadcrumb combination, the task node is set as a current task node. In response to the user's click on a subtask node of a task node, the server invokes an associated subtask page and retrieves from the session status parameters of a subtask page which the user previously entered, so as to send the subtask page including status parameters to the client. In this manner, the subtask page which the user previously browsed can be displayed at the client, and the user's experience seems to go back to the page.

According to the breadcrumb combination, the first task node is used for invoking a visited page of the first web task, which visited page may be either the same as or different to a subtask node page of the first task node. For example, the page may be a welcome page of a first web task, and the first subtask node page of the first task node is a login page. Both of them may be welcome pages.

Business logic is business application software. As the embodiment of core values of business application software like some enterprise-level software and web task software, business logic reflects various demands in work and like and logic included in corresponding solutions. A web-based application service (e.g. a web task discussed above), as one of software architectures supporting business logic, can provide corresponding logic extension points to meet demands of different business logic. A reasonable extension mechanism can be provided in software architecture and components, and various pluggable business logic extension implementations can also be provided. Various web task policies can be used for reflecting concrete business demands or business logic in web tasks and can be added to software architecture or components. With the aid of pluggable web task policies, it is possible to meet business logic more conveniently and fast develop a new web task policy when business logic changes. In addition, by introducing pluggable web task policies, it is possible to effectively accelerate the software development and reduce the software maintenance cost when demands change.

A web task may comprise multiple subtasks. The user visits at least part of subtasks in a certain order, so as to achieve given objects by using services as provided by the web task, such as flight booking, hotel reservation, and destination custom viewing. Based on different interaction data from the user end (i.e. input from the user end and response), these subtasks performs respective predetermined functions in a certain order and cooperate with each other according to predetermined traffic logic, so as to fulfill a task (e.g. flight booking, hotel reservation, and destination custom viewing) to achieve the user's object. In other words, subtasks of a predetermined task need to conform to predetermined business logic.

According to an embodiment of the present invention, a web task can be used for providing a corresponding business service for a business object of the user. As a task, the business service in itself comprises multiple subtasks associated with each other. A web task policy corresponding to an embodiment of the present invention can be used for restricting the performing of at least part of subtasks of the web task or restricting the performing of at least part of subtasks of other associated task. Hence, the web task policy can reflect the processing performed to a corresponding subtask node or an associated subtask node according to the performing of a task or its subtask.

According to another embodiment of the present invention, a web task policy can reflect constraints between multiple subtasks of a task performed by the web task. The web task policy can further reflect requirements of a target solution set of a web task which can be achieved, The processing performed to at least part of subtask nodes of the first task node according to the first web task policy enables the user's experience of subtask page browse, which is implemented using the breadcrumb combination, to conform to constraints between multiple subtasks determined by the web task policy, Hence, the user's experience of subtask page browse, which is implemented using the breadcrumb combination, also conforms to corresponding business logic. User requirements to which the web task are directed can be satisfied, and the user's experience conflicting with corresponding business logic or user requirements to which the web task are directed can be avoided effectively.

For example, during a visit to a web task for online shopping, corresponding business logic prohibits two payments for one shopping procedure (e.g. goods purchased in one shopping procedure which have been put in the shopping basket) or prohibits the repetition of an action (e.g. selecting goods, changing goods already in the shopping basket), which was taken before payment, after payment for this shopping task. A corresponding policy of the web task for online shopping may prohibit the repeated performing of a payment subtask. Or a corresponding policy of the web task for online shopping may prohibit multiple sequentially-connected subtasks, which have been performed, from being performed repeatedly in the web task after the completion of a payment subtask. Or a corresponding policy of the web task for online shopping may prohibit the web task from being performed repeatedly during a visit to the website. In this case, if the user wants to use the web task several times, he/she may repeatedly invoke the web task so as to purchase goods time and again.

According to another embodiment of the present invention, a policy of the first web task prohibits the first web task from being performed repeatedly during a visit to the website. The processing performed on at least part of subtask nodes of the first task node according to the policy of the first web task, as described in the embodiment in FIG. 1, can be further configured to remove multiple subtask nodes of the first task node according to the policy of the first web task, in response to the completion of the performing of the first web task. In this way, after the user finishes the visit to the first web task, e.g. confirming the payment for an airline ticket, the user is prevented from repeatedly visiting the payment page. If the user needs to query the purchasing result later, he/she can invoke another web task for querying results.

A policy of the first web task can prohibit the first web task from being performed repeatedly during a visit to the website. The processing performed to at least part of subtask nodes of the first task node according to the policy of the first web task can be further configured to set the first task node and its subtask node into a read-only mode according to the policy of the first web task, in response to the completion of the performing of the first web task. Further, pages associated with the first task node and its subtask nodes are: set into a read-only mode in response to the setting of the first task node and its subtask nodes into a read-only mode. In this way, the user can read information of a visited page without causing a task or a subtask to be performed repeatedly.

In another embodiment of the present invention, a policy of the first web task prohibits the loop of the subtasks. The processing performed to at least part of subtask nodes of the first task node according to the first web task can be further configured to, according to the policy of the first web task, if the third subtask node is the same as the first subtask node, remove the second subtask node and the third subtask node and set the first subtask node as a current subtask node.

According to another embodiment of the present invention, a policy of the first web task prohibits at least one subtask of the first web task from being performed repeatedly during a visit to the website. The processing performed to at least part of subtask nodes of the first task node according to the first web task can be further configured to remove at least one corresponding subtask node of the first task node according to the policy of the first web task, in response to the completion of the performing of the first web task.

According to an embodiment of the present invention, a policy of the first web task prohibits at least one subtask of the first web task from being performed repeatedly during a visit to the website. The processing performed to at least part of subtask nodes of the first task node according to the policy of the first web task is further configured to set at least one subtask node of the first task node into a read-only mode according to the policy of the first web task, in response to the completion of the performing of the first web task.

For example, after the flight booking task corresponding to a task node in the breadcrumb combination ends, it is can be determined whether information before the end of the flight booking function needs to be reserved.

For example, book a flight view the remaining flights compare fees→check out→pay by credit card→confirm After confirmation, since the user has finished the desired task, and nodes before the breadcrumb combination become useless, it can be determined whether to retain or directly return the trace record in the breadcrumb combination back to the task's start location.

For example, book a flight→view the remaining flights

It is possible to determine a corresponding web task policy according to the task's business logic and then to process the breadcrumb combination. Further, it is possible to determine where to start the task and where to end the task in a web task application by means of annotations or an external configuration file. The definition and adjustment of the web task policy can determined during web task development or adjusted by means of an external configuration file.

According to another embodiment of the present invention, multiple task nodes can be created in the breadcrumb combination created by the web server, so as to allow the user to switch between multiple tasks. For a second web task, the breadcrumb method can further generate at the breadcrumb combination root node the second task node and its multiple subtask nodes being connected sequentially. At least part of subtask nodes of the second task node are processed according to a policy of the second web task.

In the event that the breadcrumb combination comprises multiple task nodes, if the first web task is correlated with the second web task, the method can further comprise processing at least part of subtask nodes of the first task node according to a policy of the second web task. The policy of the first web task and the policy of the second web task affect each other. Take a travel for example, policies involved in determined time and place in the web task for flight booking and the web task for hotel reservation affect each other.

The processing performed to at least part of subtask nodes of the first web task according to policy of the second web task can be configured to filter multiple subtask nodes of the first task according to the policy of the second task (e.g. the web task for flight booking) and set subtask nodes being filtered out into a read-only mode.

According to another embodiment of the present invention, a policy of the second web task prohibits the loop of the first web task's multiple subtasks being associated with each other. The processing performed to at least part of subtask nodes of the first task node according to the policy of the second web task can be configured to, for two identical subtask nodes, retain only one of the two identical subtask nodes and set it as a current subtask node and remove a subtask node between the two identical subtask nodes.

For example, a task bar is flight booking, and another task bar is hotel reservation. If the date of arrival of the flight is later than the date of check-in of the hotel, then the task bar for hotel reservation can be automatically withdrawn to the "search for hotels" subtask node.

During a visit to a website, scenic spot viewing can also be regarded as a task comprising multiple subtasks. In response to a user's request for visiting a travel website, the web server establishes an Http session communicating with the user and assigns a unique session identifier and a session storage space for the session. In response to the user's request for visiting the travel website, the web server further generates a breadcrumb root node of a breadcrumb combination. The breadcrumb combination is stored in the session storage space.

In response to the user's request for visiting the view scenic spots web task, a first task node (view scenic spots task node) associated with the view scenic spots web task is generated at the breadcrumb root node. The user uses subtasks of the view scenic spots web task, namely view scenic spots in Beijing Municipality, view scenic spots in Haidian District, view Shangdi area, and view scenic spots in the vicinity of software zone, and browses through corresponding pages. In response to multiple requests for these multiple subtasks of the view scenic spots web task, the web server sequentially establishes multiple subtask nodes of the first task node. The multiple subtask nodes of the first task node are respectively associated with the above multiple subtasks of the view scenic spots web task, and they are connected according to the order of the multiple requests. The user's breadcrumb path is obtained as below:

view scenic spots in Beijing Municipality→view scenic spots in Haidian District→view shangdi area→view scenic spots in the vicinity of software zone.

According to this embodiment, at least part of subtasks of the web task, which the user has browsed through, respectively correspond to multiple subtask nodes of a task node in the breadcrumb combination. By utilizing the hierarchical relationship among a breadcrumb combination, a task node, and a subtask node, the breadcrumb combination displays the record and trace the track along which the user fulfills a task.

Similarly, a user interacts with the website generally to fulfill a certain task or achieve a certain purpose. For example, flight booking is that the user fulfills a function of flight booking by utilizing a series of browse functions of the website, namely view the remaining flights→compare fees-→place an order→check out. Accordingly, a flight booking task node and its multiple subtask nodes can be established at a breadcrumb combination root node, and status parameters of the corresponding pages visited by the user are recorded.

In this way, the breadcrumb combination traces and records the view scenic spots task, the book a flight task, and their subtasks by utilizing task nodes and subtask nodes.

According to an embodiment of the present invention, the performing of multiple tasks in a breadcrumb combination is traced and recorded by establishing the hierarchical relationship among the breadcrumb combination root node and multiple task nodes. Furthermore, it is possible to switch between multiple tasks in the breadcrumb combination so that a convenient interface function is provided for the user. In the example described above, the breadcrumb combination comprises two task nodes, and the user can switch between these two tasks at will. Breadcrumb combination code which can be displayed by the client may be generated based on the breadcrumb combination; and the breadcrumb combination code may be sent to the client. In addition, a proper identification can be provided for display a task that is being performed currently. In the following example, the symbol "*" before "scenic spots" identifies a current task. The breadcrumb combination displayed on the user end comprises two task bars, which can be displayed as below.
Your task
→book a flight→view the remaining flights→compare fees
→(*) browse through scenic spots→Beijing Municipality→Haidian District→Shangdi According to a further embodiment of the present invention, it is possible to process at least part of subtask nodes of a task node according to a policy of a web task. In this way, the breadcrumb combination can be mapped to a business logic function according to a policy of a web task.

According to a policy of a web task, it is possible to process the loop occurring in the user browse path. A website has a net structure, so the user can browse at random via the net structure. In this case, loop might occur because the breadcrumb combination records all browse paths. For example, the user enters page A, page B, and then page C, and jumps back to page B from the link from page C. At this moment, it is necessary to choose which one of the following manners, so as to conform to business logic:
A→B→C→B or A→B According to an embodiment of the present invention, it is possible to decide whether two subtask nodes are identical to each other, according to one of the following manners. Concrete manners for decision can be based on customized business policies.
 a. completely identical urls
 b. completely identical urls+identical parameters
 c. completely identical urls+identical specified parameters
 d. other customized policy If two identical subtask nodes are determined, it indicates the loop of subtask nodes. The loop can be processed in one of the following manners:
 a. adding loop directly, i.e. keep the loop unchanged;
 b. decycling and exiting to a subtask node before the decycling. In other words, for multiple subtask nodes between two identical subtask nodes, only one of the two subtask nodes is retained (the other of the two subtask nodes is removed) and set as a current subtask node.

In response to the end of a task, the breadcrumb combination can perform corresponding processing according to a task policy of business logic being reflected.

Take flight booking for example. After checkout and entry into the checkout summary page, a business policy needs to be combined to determine whether the breadcrumb combination breadcrumb information before checkout should be provided.

For example, keep: book a flight→view the remaining flights→compare fees→check out→pay by credit card-→confirm or retain only: book a flight→confirm According to an embodiment of the present invention, it is possible to switch between multiple tasks by using a breadcrumb combination. For example, in a tourism product booking website, if there is a need to reserve a flight, a hotel, and also a car, then the breadcrumb combination may comprise multiple task nodes, e.g. three task nodes, and the user can switch between these three tasks at any time. As the user visits multiple web tasks associated with the website, a breadcrumb combination as below can be created and displayed at the client.
Your task:
Book a flight
Your task:
Book a flight→view the remaining flights→compare fees
Your task:
Book a flight→view the remaining flights→compare fees
Reserve a hotel→view local hotels
Your task:
Book a flight→view the remaining flights→compare fees
Reserve a hotel→view local hotels
Book a car service According to an embodiment of the present invention, a first web task associated with a website may be a web task provided by the website directly or a web task provided by the website to a user. In the latter scenario, a corresponding task node and its subtask nodes can also be generated at a breadcrumb combination root node. Status parameters of subtask nodes (status parameters of pages associated with subtask nodes) can be maintained by a server where the web task is located and are sent by the website to the client as per the user's request. Also, status parameters of subtask nodes can be maintained by a server where the web task is located, are cached in the website, and are then sent by the website to the client based on the user's request.

The breadcrumb combination makes it convenient to browse through web pages forward and backward and supports the maintenance of page status at the server side. web tasks are generally dominated at the se side and managed in a concentrated manner, and user access is provided at the user side. The breadcrumb combination can support a predetermined web task policy, such as preventing the repeated performing of an operation that allows to be performed once.

Figure 2:
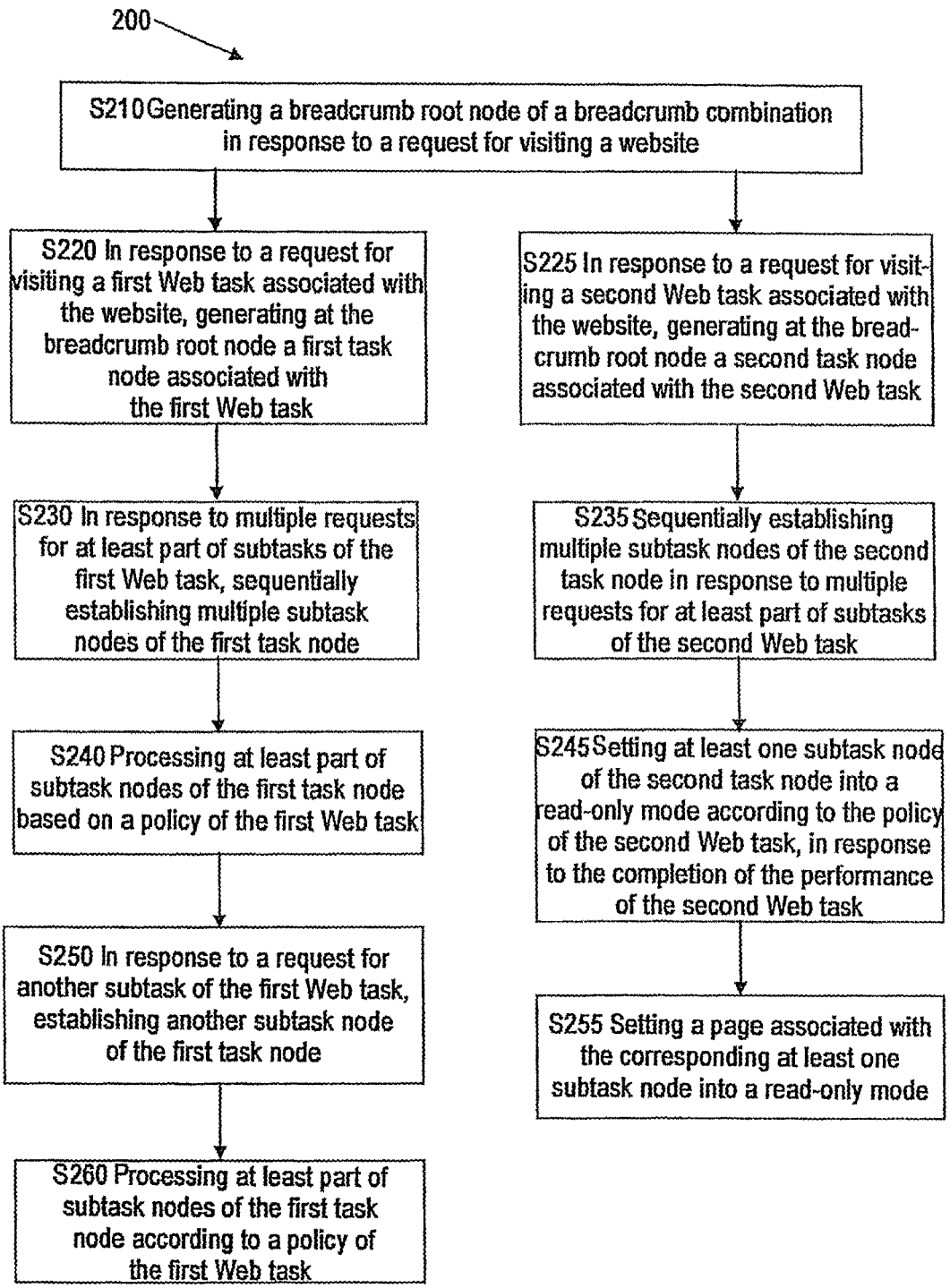
FIG. 2 shows a flowchart of a breadcrumb method according to another embodiment of the present invention.

FIG. 2 shows a flowchart of a breadcrumb method according to another embodiment of the present invention. In a method 200 as shown, in step S210, a breadcrumb root node of a breadcrumb combination is generated in response to a request for visiting a website. In step S220, in response to a request for visiting a first web task associated with the website, a first task node associated with the first web task is generated at the breadcrumb root node. In step S230, in response to multiple requests for at least part of subtasks of the first web task, multiple subtask nodes of the first task node are established sequentially. In step S240, at least part of subtask nodes of the first task node are processed based on a policy of the first web task. In step S250, in response to a request for another subtask of the first web task, another subtask node of the first task node is established. In step S260, at least part of subtask nodes of the first task node are processed according to a policy of the first web task.

In step S225, in response to a request for visiting a second web task associated with the website, a second task node associated with the second web task is generated at the breadcrumb root node. In step S235, multiple subtask nodes of the second task node are established sequentially in response to multiple requests for at least part of subtasks of the second web task. In this embodiment, a policy of the second web task prohibits at least one subtask of the first web task from being performed repeatedly during a visit. In step S245, at least part of subtask nodes of the second task node are processed based on a policy of the second Web task. In one embodiment, at least one subtask node of the second task node is set into a read-only mode according to the policy of the second web task, in response to the completion of the performing of the second web task. In step S255, a page associated with the corresponding at least one subtask node is set into a read-only mode.

Figure 3:
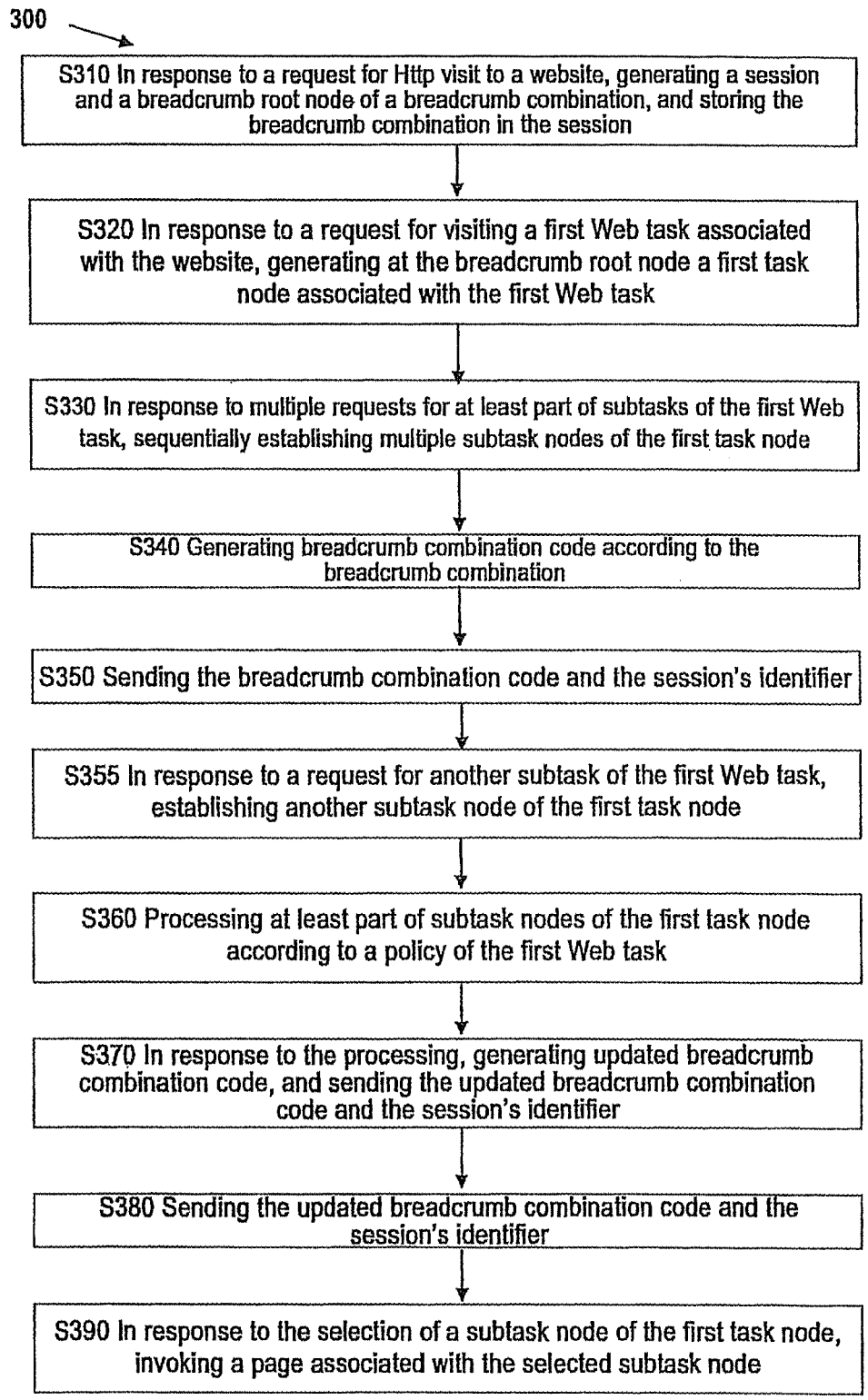
FIG. 3 shows a flowchart of a breadcrumb method according to another embodiment of the present invention.

FIG. 3 shows a flowchart of a breadcrumb method according to another embodiment of the present invention. In a method 300 as shown, in step S310, in response to a request for http visiting a website, a session and a breadcrumb root node of a breadcrumb combination are generated, and the breadcrumb combination is stored in the session. In step S320, in response to a request for visiting a first web task associated with the website, a first task node associated with the first web task is generated at the breadcrumb root node. In step S330, in response to multiple requests for at least part of subtasks of the first web task, multiple subtask nodes of the first task node are established sequentially. In step S340, breadcrumb combination code is generated according to the breadcrumb combination. In step S350, the breadcrumb combination code and the session's identifier are sent. In step S355, in response to request for another subtask of the first web task, another subtask node of the first task node is established. In step S360, at least part of subtask nodes of the first task node are processed according to a policy of the first web task, wherein the policy of the first web task is used for restricting the performing of the at least part of subtasks of the first web task. In step S370, in response to the processing, updated breadcrumb combination code is generated, and the updated breadcrumb combination code and the session's identifier are sent. In step S380, the updated breadcrumb combination code and the session's identifier are sent. In step S395, in response to the selection of a subtask node of the first task node, a page associated with the selected subtask node is invoked.

Figure 4:
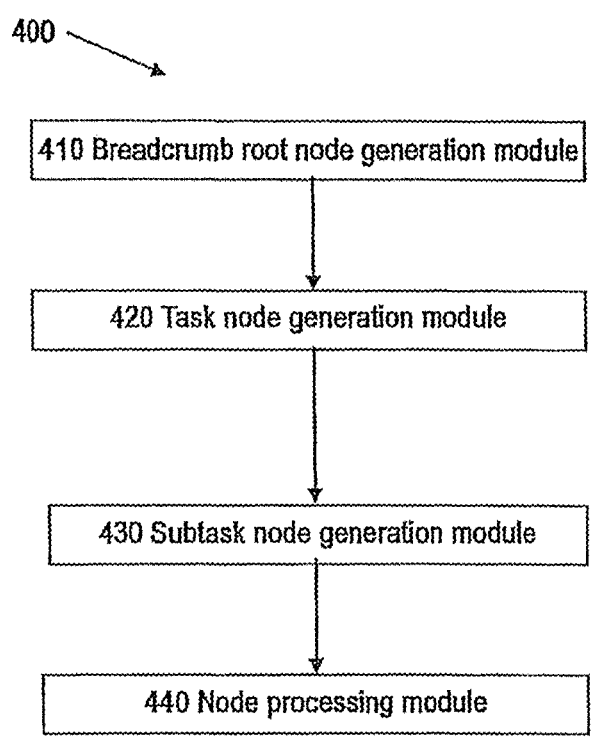
FIG. 4 shows a block diagram of a breadcrumb system according to another embodiment of the present invention.

FIG. 4 shows a block diagram of a breadcrumb system according to an embodiment of the present invention. A breadcrumb system 400 of a website comprises the following modules: a breadcrumb root node generation module 410 for generating a breadcrumb root node of a breadcrumb combination in response to a request for visiting a website; a task node generation module 420 for, in response to a request for visiting a first web task associated with the website, generating at the breadcrumb root node a first task node associated with the first web task; a subtask node generation module 430 for, in response to multiple requests for at least part of subtasks of the first web task, sequentially establishing multiple subtask nodes of the first task node, wherein the multiple subtask nodes of the first task node are respectively associated with the at least part of subtasks of the first web task, and they are sequentially connected according to the order of the multiple requests; and a node processing module 440 for processing at least part of subtask nodes of the first task node based on a policy of the first web task.

Task node generation module 420 can further be configured to, in response to a request for visiting a second web task associated with the website, generate at the breadcrumb root node a second task node associated with the second web task. Subtask node generation module 430 can further be configured to, in response to multiple requests for at least part of subtasks of the second web task, sequentially establishing multiple subtask nodes of the second task node, wherein the multiple subtask nodes of the second task node are respectively associated with the at least part of subtasks of the second web task, and they are sequentially connected according to the order of the multiple requests. Node processing module 440 can further be configured to process at least part of subtask nodes of the second task node based on a policy of the second web task.

The breadcrumb combination can be stored in a session of a server. The system can further comprise a breadcrumb combination processing module, which is configured to: generate breadcrumb combination code supported by a client display, according to the breadcrumb combination; and send the breadcrumb combination code via the session.

Node processing module 440 can further be configured to process the at least part of subtask nodes of the first task node based on the policy of the second web task.

The policy of the first web task prohibits at least one subtask of the first web task from being performed repeatedly during a visit to the website. Node processing module 440 can further be configured to remove at least one subtask node of the first task node according to the policy of the first web task, in response to the completion of the performing of the first web task.

The policy of the first web task prohibits at least one subtask of the first web task from being performed repeatedly during a visit to the website. Node processing module 440 can further be configured to set at least one subtask node of the first task node into a read-only mode according to the policy of the first web task, in response to the completion of the performing of the first web task.

System 400 can further comprise a page processing module, which is configured to, in response to the setting of at least one corresponding subtask node of the first task node into a read-only mode, set a page associated with the at least one corresponding subtask node of the first task node into a read-only mode.

The policy of the first web task prohibits the loop of subtasks. Node processing module 440 can further be configured to, for two identical subtask nodes in the breadcrumb combination, retain only one of the two identical subtask nodes and set it as a current subtask node and remove subtask nodes between the two identical subtask nodes.

The two identical subtask nodes have the same URL and predetermined parameter values.

Node processing module 440 can further be configured to, response to the selection of a first subtask node of the first task node, invoke a page associated with the selected subtask node.

In the foregoing description of the present invention, "first", "second" and so on are merely used for the purpose of designation. Those skilled in the art would appreciate that the policy of the first web task can be used as the policy of the second web task according to circumstances.

The present invention further provides a computer readable storage medium having instructions for implementing a method according to the present invention stored therein.

The flowcharts and block diagram in the figures illustrate the system, methods, as well as architecture, functions and operations executable by a computer program product. Each block in the flowcharts or block diagram may represent a module, a program segment, or a part of program code, which contains one or more executable instructions for performing specified logic functions. In one embodiment, the computer program product comprises a computer readable storage medium 95 that stores computer readable program code or instructions 97 (see FIG. 5). It should be noted that in some alternative implementations, functions indicated in blocks may occur in an order differing from the order as shown in the figures. For example, two blocks shown consecutively may be performed in parallel substantially or in an inverse order. This depends on relevant functions. Of course, the block diagram and/or each block in the flowcharts, and the block diagram and/or a combination of blocks in the flowcharts can be implemented by a dedicated, hardware-based system that performs specified functions or operations, or implemented by a combination of dedicated hardware and computer instructions.

Those skilled in the art would appreciate that the present invention can be embodied as a system, a method or a computer program product. Therefore, the present invention can be implemented as full hardware, full software (including firmware, resident software, micro-code, etc.) or a combination of a software portion, referred to as a "circuit," "module" or "system" in the specification, and a hardware portion. In addition, the present invention can take a form of computer program product embodied in any tangible medium of expression, the medium containing computer-useable program code.

Any combination of one or more computer-usable or computer-readable media can be employed. The computer-useable or computer-readable medium may be, for example, without limitation to, an electric, magnetic, optical, electro-magnetic, infrared, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can store the program for use by or in connection with the instruction execution system, apparatus, or device. The computer-readable medium may include the computer-readable program code embodied therewith.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention is described in detail with reference to preferred solutions, it is to be understood that the above embodiments are presented for purpose of illustration only rather than limitation. Those skilled in the art can modify the solutions of the present invention without departing from the spirit and scope of the present invention.

What is claimed is:

1. A method, said method comprising:
after a first task node has been generated in a tree structure at a breadcrumb root node in the tree structure in response to receiving a request for visiting a first web task associated with a website, and in response to sequentially receiving requests for multiple subtasks of the first web task, sequentially establishing in the tree structure, by a processor of a computer system, multiple subtask nodes of the first task node, wherein the subtask nodes of the multiple subtask nodes of the first task node are respectively associated with the subtasks of the multiple subtasks of the first web task and are sequentially connected to the first task node according to a sequential order of the sequentially received requests for the multiple subtasks of the first web task; and after said sequentially establishing in the tree structure the multiple subtask nodes of the first task node, said processor processing the multiple subtask nodes of the first task node based on a policy of the first web task, wherein said processing the multiple subtasks nodes of the first task node comprises said processor responding to a user's click on the tree structure of at least one subtask node of the first task node, by invoking at least one web page associated with the at least one subtask node and sending the at least one web page to the user's client, wherein said processing the multiple subtask nodes of the first task node based on the policy of the first web task comprises dynamically reconfiguring the multiple subtask nodes of the first task node in response to the user's visitation of one or more subtask nodes of the multiple subtask nodes of the first task node, said dynamically reconfiguring avoiding one or more repetitive operations during performance of the first web task, and wherein said avoiding one or more repetitive operations comprises:
prohibiting the first web task from being performed repeatedly during a visit to the website;
in response to the first web task having been completed, setting both the first task node and the multiple subtask nodes of the first task node into a read-only mode; and
in response to said setting both the first task node and the multiple subtask nodes of the first task node into the read-only mode, setting a web page associated with the first task node and web pages associated with the multiple subtask nodes of the first task node into the read-only mode.

2. The method of claim 1, wherein said processing the multiple subtask nodes of the first task node based on the policy of the first web task comprises:
prohibiting the first web task from being performed repeatedly during a visit to the website; and
in response to the first web task having been completed, removing the multiple subtask nodes of the first task node.

3. The method of claim 1, wherein said processing the multiple subtask nodes of the first task node based on the policy of the first web task comprises:
prohibiting a first subtask of the multiple subtasks of the first web task from being performed repeatedly during a visit to the website; and
in response to the first web task having been completed, removing a first subtask node of the multiple subtask nodes of the first task node, wherein the first subtask node is associated with the first subtask.

4. The method of claim 1, wherein the multiple subtask nodes of the first task node comprises a first subtask node, a third subtask node identical to the first subtask node, and a second subtask node between and connected to the first and third subtask nodes, and wherein said processing the multiple subtask nodes of the first task node based on at least one policy of the first web task comprises:
prohibiting looping through the subtasks of the multiple subtasks of the first web task; and in response to the third subtask node being identical to the first subtask node, setting the first subtask node as a current subtask node and removing the second and third subtask nodes.

5. The method of claim 1, wherein the method further comprises:
after said generating the breadcrumb root node and in response to receiving a request for visiting a second web task associated with the website, said processor generating a second task node in the tree structure at the breadcrumb root node;
after said generating the second task node and in response to sequentially receiving requests for multiple subtasks of the second web task, said processor sequentially establishing in the tree structure multiple subtask nodes of the second task node, wherein the subtask nodes of the multiple subtask nodes of the second task node are respectively associated with the subtasks of the multiple subtasks of the second web task and are sequentially connected to the second task node according to a sequential order of the sequentially received requests for the multiple subtasks of the second web task;
after said sequentially establishing in the tree structure the multiple subtask nodes of the second task node, said processor processing the multiple subtask nodes of the second task node based on a policy of the second web task; and
after said sequentially establishing in the tree structure the multiple subtask nodes of the first task node, said processor processing at least one subtask node of the multiple subtask nodes of the first task node based on the policy of the second web task, wherein the first web task is correlated with the second web task.

6. The method of claim 5, wherein said processing the at least one subtask node of the multiple subtask nodes of the first task node based on the policy of the second web task comprises:
filtering the at least one subtask node of the multiple subtask nodes of the first task node into a read-only mode.

7. A computer program product, comprising a computer readable hardware storage medium having a computer readable program code stored therein, said computer readable program code containing instructions executable by a processor of a computer system to implement a method, said method comprising:
after a first task node has been generated in a tree structure at a breadcrumb root node in the tree structure in response to receiving a request for visiting a first web task associated with a website, and in response to sequentially receiving requests for multiple subtasks of the first web task, sequentially establishing in the tree structure, by the processor, multiple subtask nodes of the first task node, wherein the subtask nodes of the multiple subtask nodes of the first task node are respectively associated with the subtasks of the multiple subtasks of the first web task and are sequentially connected to the first task node according to a sequential order of the sequentially received requests for the multiple subtasks of the first web task; and
after said sequentially establishing in the tree structure the multiple subtask nodes of the first task node, said processor processing the multiple subtask nodes of the first task node based on a policy of the first web task, wherein said processing the multiple subtasks nodes of the first task node comprises said processor responding to a user's click on the tree structure of at least one subtask node of the first task node, by invoking at least one web page associated with the at least one subtask node and sending the at least one web page to the user's client,
wherein said processing the multiple subtask nodes of the first task node based on the policy of the first web task comprises dynamically reconfiguring the multiple subtask nodes of the first task node in response to the user's visitation of one or more subtask nodes of the multiple subtask nodes of the first task node, said dynamically reconfiguring avoiding one or more repetitive operations during performance of the first web task, and
wherein said avoiding one or more repetitive operations comprises:
prohibiting the first web task from being performed repeatedly during a visit to the website;
in response to the first web task having been completed, setting both the first task node and the multiple subtask nodes of the first task node into a read-only mode; and
in response to said setting both the first task node and the multiple subtask nodes of the first task node into the read-only mode, setting a web page associated with the first task node and web pages associated with the multiple subtask nodes of the first task node into the read-only mode.

8. The computer program product of claim 7, wherein said processing the multiple subtask nodes of the first task node based on the policy of the first web task comprises:
prohibiting the first web task from being performed repeatedly during a visit to the website; and
in response to the first web task having been completed, removing the multiple subtask nodes of the first task node.

9. The computer program product of claim 7, wherein said processing the multiple subtask nodes of the first task node based on the policy of the first web task comprises:
prohibiting a first subtask of the multiple subtasks of the first web task from being performed repeatedly during a visit to the website; and
in response to the first web task having been completed, removing a first subtask node of the multiple subtask nodes of the first task node, wherein the first subtask node is associated with the first subtask.

10. The computer program product of claim 7, wherein the multiple subtask nodes of the first task node comprises a first subtask node, a third subtask node identical to the first subtask node, and a second subtask node between and connected to the first and third subtask nodes, and wherein said processing the multiple subtask nodes of the first task node based on at least one policy of the first web task comprises:
prohibiting looping through the subtasks of the multiple subtasks of the first web task; and
in response to the third subtask node being identical to the first subtask node, setting the first subtask node as a current subtask node and removing the second and third subtask nodes.

11. The computer program product of claim 7, wherein the method further comprises:
after said generating the breadcrumb root node and in response to receiving a request for visiting a second web task associated with the website, said processor generating a second task node in the tree structure at the breadcrumb root node;
after said generating the second task node and in response to sequentially receiving requests for multiple subtasks of the second web task, said processor sequentially establishing in the tree structure multiple subtask nodes of the second task node, wherein the subtask nodes of the multiple subtask nodes of the second task node are respectively associated with the subtasks of the multiple subtasks of the second web task and are sequentially connected to the second task node according to a sequential order of the sequentially received requests for the multiple subtasks of the second web task;

after said sequentially establishing in the tree structure the multiple subtask nodes of the second task node, said processor processing the multiple subtask nodes of the second task node based on a policy of the second web task; and after said sequentially establishing in the tree structure the multiple subtask nodes of the first task node, said processor processing at least one subtask node of the multiple subtask nodes of the first task node based on the policy of the second web task, wherein the first web task is correlated with the second web task.

12. The computer program product of claim 11, wherein said processing the at least one subtask node of the multiple subtask nodes of the first task node based on the policy of the second web task comprises:

filtering the at least one subtask node of the multiple subtask nodes of the first task node into a read-only mode.

13. A computer system comprising a processor and a computer readable memory unit coupled to the processor, said memory unit containing instructions executable by the processor to implement a method, said method comprising:

after a first task node has been generated in a tree structure at a breadcrumb root node in the tree structure in response to receiving a request for visiting a first web task associated with a website, and in response to sequentially receiving requests for multiple subtasks of the first web task, sequentially establishing in the tree structure, by the processor, multiple subtask nodes of the first task node, wherein the subtask nodes of the multiple subtask nodes of the first task node are respectively associated with the subtasks of the multiple subtasks of the first web task and are sequentially connected to the first task node according to a sequential order of the sequentially received requests for the multiple subtasks of the first web task; and after said sequentially establishing in the tree structure the multiple subtask nodes of the first task node, said processor processing the multiple subtask nodes of the first task node based on a policy of the first web task, wherein said processing the multiple subtasks nodes of the first task node comprises said processor responding to a user's click on the tree structure of at least one subtask node of the first task node, by invoking at least one web page associated with the at least one subtask node and sending the at least one web page to the user's client, wherein said processing the multiple subtask nodes of the first task node based on the policy of the first web task comprises dynamically reconfiguring the multiple subtask nodes of the first task node in response to the user's visitation of one or more subtask nodes of the multiple subtask nodes of the first task node, said dynamically reconfiguring avoiding one or more repetitive operations during performance of the first web task, and wherein said avoiding one or more repetitive operations comprises:

prohibiting the first web task from being performed repeatedly during a visit to the website;

in response to the first web task having been completed, setting both the first task node and the multiple subtask nodes of the first task node into a read-only mode; and in response to said setting both the first task node and the multiple subtask nodes of the first task node into the read-only mode, setting a web page associated with the first task node and web pages associated with the multiple subtask nodes of the first task node into the read-only mode.

14. The computer system of claim 13, wherein said processing the multiple subtask nodes of the first task node based on the policy of the first web task comprises:

prohibiting the first web task from being performed repeatedly during a visit to the website; and in response to the first web task having been completed, removing the multiple subtask nodes of the first task node.

15. The computer system of claim 13, wherein said processing the multiple subtask nodes of the first task node based on the policy of the first web task comprises:

prohibiting a first subtask of the multiple subtasks of the first web task from being performed repeatedly during a visit to the website; and in response to the first web task having been completed, removing a first subtask node of the multiple subtask nodes of the first task node, wherein the first subtask node is associated with the first subtask.

16. The computer system of claim 13, wherein the multiple subtask nodes of the first task node comprises a first subtask node, a third subtask node identical to the first subtask node, and a second subtask node between and connected to the first and third subtask nodes, and wherein said processing the multiple subtask nodes of the first task node based on at least one policy of the first web task comprises:

prohibiting looping through the subtasks of the multiple subtasks of the first web task; and in response to the third subtask node being identical to the first subtask node, setting the first subtask node as a current subtask node and removing the second and third subtask nodes.

17. The computer system of claim 13, wherein the method further comprises:

after said generating the breadcrumb root node and in response to receiving a request for visiting a second web task associated with the website, said processor generating a second task node in the tree structure at the breadcrumb root node;

after said generating the second task node and in response to sequentially receiving requests for multiple subtasks of the second web task, said processor sequentially establishing in the tree structure multiple subtask nodes of the second task node, wherein the subtask nodes of the multiple subtask nodes of the second task node are respectively associated with the subtasks of the multiple subtasks of the second web task and are sequentially connected to the second task node according to a sequential order of the sequentially received requests for the multiple subtasks of the second web task;

after said sequentially establishing in the tree structure the multiple subtask nodes of the second task node, processing the multiple subtask nodes of the second task node based on a policy of the second web task; and after said sequentially establishing in the tree structure the multiple subtask nodes of the first task node, said processor processing at least one subtask node of the multiple subtask nodes of the first task node based on the policy of the second web task, wherein the first web task is correlated with the second web task.

18. The computer system of claim 17, wherein said processing the at least one subtask node of the multiple subtask nodes of the first task node based on the policy of the second web task comprises:

filtering the at least one subtask node of the multiple subtask nodes of the first task node into a read-only mode.

\* \* \* \* \*